US007634266B2

(12) United States Patent
McDougall et al.

(10) Patent No.: US 7,634,266 B2
(45) Date of Patent: Dec. 15, 2009

(54) AGGREGATING LOCATION ACCURACY DATA TO ESTIMATE ACCURACY OF A WIRELESS LOCATING SYSTEM

(75) Inventors: Jeff McDougall, College Station, TX (US); Jeff Durrant, Carrollton, TX (US)

(73) Assignee: PivotPoint Solutions, LLC, Bryan, TX (US)

( * ) Notice: Subject to any disclaimer, the term of this patent is extended or adjusted under 35 U.S.C. 154(b) by 341 days.

(21) Appl. No.: 11/255,466

(22) Filed: Oct. 21, 2005

(65) Prior Publication Data

US 2007/0093257 A1 Apr. 26, 2007

(51) Int. Cl.
*H04W 24/00* (2006.01)
*H04M 11/04* (2006.01)
*G01S 3/02* (2006.01)

(52) U.S. Cl. ............... 455/423; 455/404.2; 342/450
(58) Field of Classification Search ............ None
See application file for complete search history.

(56) References Cited

U.S. PATENT DOCUMENTS

| | | | | |
|---|---|---|---|---|
| 6,865,395 | B2 | 3/2005 | Riley ............... | 455/456.1 |
| 6,947,734 | B1 * | 9/2005 | Toubassi ............ | 455/423 |
| 7,047,019 | B1 * | 5/2006 | Cox et al. ........... | 455/456.1 |

OTHER PUBLICATIONS

Federal Communications Commission, Guidelines for Testing and Verifying the Accuracy of Wireless E911 Location Systems, Apr. 12, 2000, pp. 13 pages.
Z Biacs G. Marshall M. Moeglein, W. Riley, The Qualcomm/SnapTrack Wireless-Assisted GPS Hybrid Positioning System and Results from Initial Commercial Deployments, 7 pages.

* cited by examiner

*Primary Examiner*—Lester Kincaid
*Assistant Examiner*—Joel Ajayi
(74) *Attorney, Agent, or Firm*—Fish & Richardson P.C.

(57) ABSTRACT

Location determination accuracy in a mobile telecommunications environment can be estimated based on location determination accuracy data for multiple empirical test calls in a geographic region. A location of a wireless station for each test call is determined using one of multiple wireless locating techniques, and an approximate ratio of wireless locating techniques for the empirical test calls is identified. Subscriber call data relating to location estimates determined using one of the wireless locating techniques is received. Location determination accuracy in the geographic region is estimated by combining the subscriber call data according to the identified ratio. To facilitate determinations of locating accuracy, the geographic region is logically segmented into multiple areas. Each area is associated with a performance profile that relates to a locating accuracy performance. Location determination accuracy is estimated based on one or more areas associated with each wireless call in the geographic region.

27 Claims, 5 Drawing Sheets

AGGREGATING LOCATION ACCURACY DATA TO ESTIMATE ACCURACY OF A WIRELESS LOCATING SYSTEM

TECHNICAL FIELD

This description relates to mobile telecommunications, and more particularly to aggregating location accuracy data for estimating the accuracy of a wireless locating system.

BACKGROUND

Wireless carriers are required by the Federal Communications Commission (FCC) to support enhanced 911 (E911) service that enables the carrier to provide emergency personnel with an approximate location of a wireless caller that places a 911 call. Initially, under Phase I E911 requirements, wireless carriers simply had to identify the telephone number of the caller and the location of the cell site or base station through which the call was received. Under Phase II E911, wireless carriers must provide the public safety answering point (PSAP) with the longitude and latitude location of all wireless 911 callers in compliance with certain accuracy and reliability standards that differ for network-based solutions and handset-based solutions.

Using a network-based location technology, hardware and/or software on the wireless network side is used to determine locations, rather than using any special locating hardware and/or software in the mobile station itself. According to Phase II E911 requirements for network-based solutions, wireless carriers must deploy automatic location identification technologies that identify location within one hundred meters for sixty seven percent of calls and within three hundred meters for ninety five percent of calls. Using a handset-based location technology, the mobile station includes special locating hardware and/or software, which may or may not be supplemented by hardware and/or software on the network side. According to Phase II E911 requirements for handset-based solutions, wireless carriers must deploy automatic location identification technologies that identify location within fifty meters for sixty seven percent of calls and within one hundred fifty meters for ninety five percent of calls.

In addition to the FCC's E911 service requirements, wireless carriers may offer other value-added services based on locating technologies. Both to comply with the E911 requirements and to ensure that deployed locating technologies provide adequate accuracy to satisfy the purposes of such value-added services, wireless carriers need to perform tests to verify the accuracy of the locating technologies. Typically, such tests rely upon empirical measurements. For example, testing locating accuracy throughout even a relatively small geographic region may involve placing thousands of test calls from various different locations throughout the region to determine how the actual known location from which each call is placed compares with the location estimate determined and/or reported by the wireless network. Such empirical tests may also need to be repeated periodically to ensure continued accuracy in the face of changing environmental conditions, aging equipment, changes to the network infrastructure, and the like.

SUMMARY

Because empirical testing requires significant time to place calls all across a region and needs to be repeated relatively frequently, such testing can be time-consuming and expensive. Various techniques are described in this specification for estimating the accuracy of locating techniques. For example, techniques can be implemented for segmenting a region into numerous, relatively small areas, each having an expected location-estimating performance based, e.g., on land use characteristics of the area. Techniques can also be implemented for normalizing call data samples from such areas according to the percentage of the region having a similar location-estimating performance. In addition, call data from subscriber calls can be used to identify changes or confirm no significant changes with respect to locating accuracy determinations made through empirical testing. Call data from subscriber calls made using different locating technologies can be normalized according to the percentage of each locating technology used in empirical test calls that establish a baseline locating accuracy.

In one general aspect, location determination accuracy in a mobile telecommunications environment can be ascertained by obtaining location determination accuracy data for multiple empirical test calls in a geographic region. A location of a wireless station for each test call is determined using at least one of multiple wireless locating techniques. An approximate ratio of wireless locating techniques for the empirical test calls is identified, and subscriber call data in the geographic region is received. The data includes information relating to location estimates determined using one or more of the wireless locating techniques. Location determination accuracy in the geographic region is estimated by combining at least portions of the subscriber call data in accordance with the identified ratio.

Implementations can include one or more of the following features. The identified ratio of wireless locating techniques for the empirical test calls is determined based on at least an approximate percentage of the empirical test calls that use each wireless locating technique. Portions of the subscriber call data are combined by weighting subscriber call data for each wireless locating technique using a percentage corresponding to the wireless locating technique. The subscriber call data includes an estimated position error and an identification of a wireless locating technique for each subscriber call. The subscriber call data further includes network operation data, and subscriber call candidates are identified for use in estimating location determination accuracy based on the network operation data.

The location determination accuracy data for each empirical test call includes a difference between an actual location associated with the test call and an estimated position determined using a wireless locating technique for the test call. An error bias between the difference and an estimated position error is determined for each test call, and the estimated position error for the subscriber calls is adjusted according to the error bias to estimate location determination accuracy. The geographic region is segmented into multiple areas, and each area is associated with one of multiple location-estimating performance types. An approximate ratio among the location-estimating performance types is identified, and at least portions of the subscriber call data are weighted according to the identified performance type ratio to estimate location determination accuracy. The weighting is based on one or more performance types associated with each subscriber call. The performance types associated with each subscriber call are identified based on the performance type of the areas within an error range of an estimated position.

In another general aspect, determinations of locating accuracy in a mobile telecommunications environment are facilitated by identifying a geographic region and logically segmenting the geographic region into multiple areas. Each area is associated with one of multiple performance profiles relating to a locating accuracy performance, and location determination accuracy is estimated based on one or more areas associated with each of multiple wireless calls in the geographic region.

Implementations can include one or more of the following features. The location determination accuracy is estimated by normalizing location error data from the wireless calls according to an approximate percentage of the geographic region associated with each performance profile. The location error data is normalized by determining the approximate percentage of the geographic region associated with each performance profile and determining one or more performance profiles associated with each wireless call. The performance profiles correspond to the one or more areas associated with the wireless call. Location error data for wireless calls associated with each performance profile is weighted according to the approximate percentage.

The wireless calls can be test calls involving wireless stations at known locations, and the location error data can be empirical location error data. Alternatively, the wireless calls can be subscriber calls, and the location error data can be estimated location error data based on uncertainty observations associated with each subscriber call. The one or more areas associated with each wireless call are determined using the location error data, and an approximate percentage of each area associated with each wireless call is identified. Location error data for each wireless call is weighted according to the identified percentages. The quantity of different performance profiles is fewer than a quantity of different areas. Each performance profile corresponds to one of multiple land use categories. The geographic region is logically segmented into a plurality of grid-based areas.

The details of one or more implementations are set forth in the accompanying drawings and the description below. Other features will be apparent from the description and drawings, and from the claims.

DESCRIPTION OF DRAWINGS

Like reference symbols in the various drawings indicate like elements.

DETAILED DESCRIPTION

Figure 1:
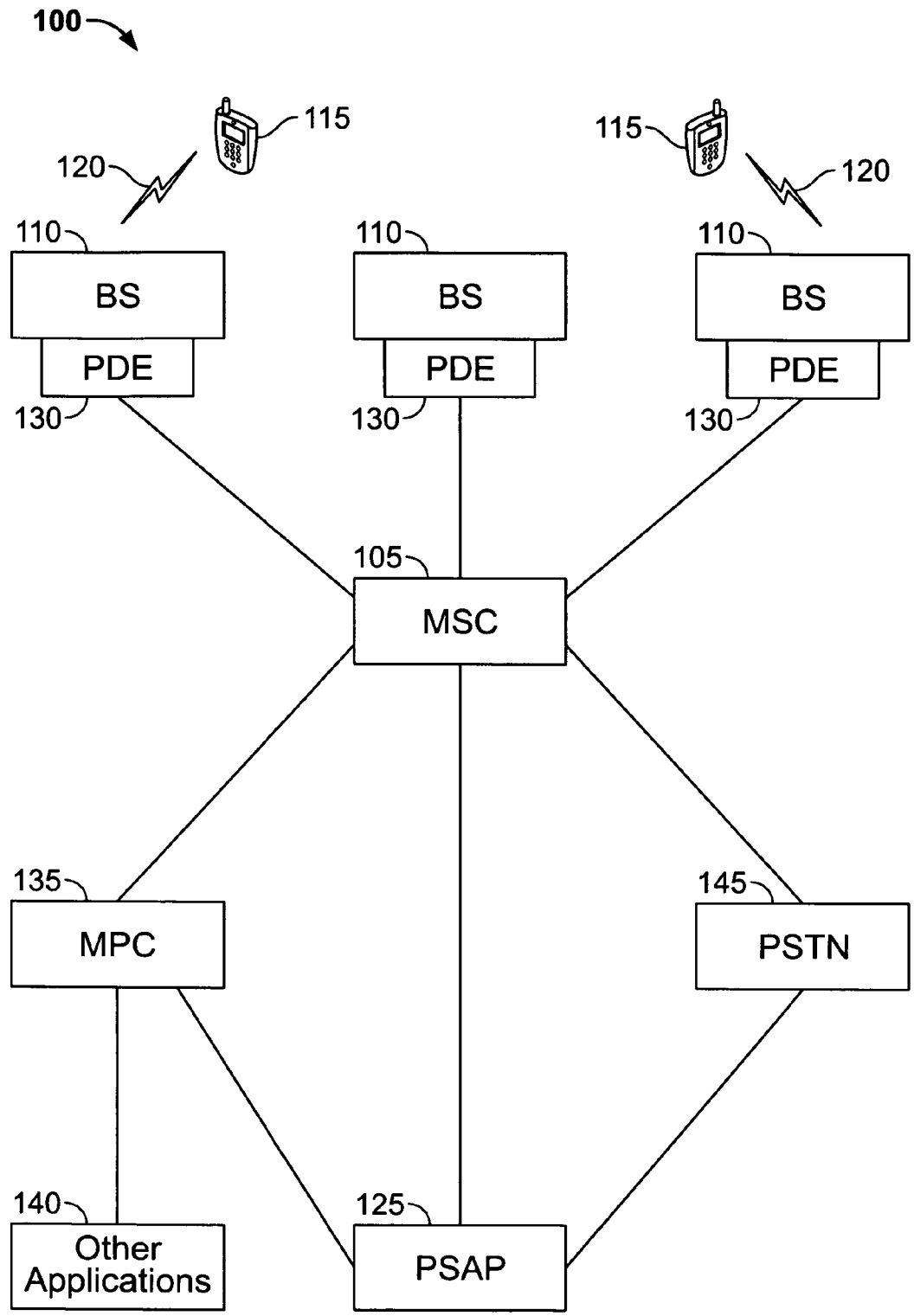
FIG. 1 is a block diagram of one example of a wireless telecommunication network that includes location determination capabilities.

FIG. 1 is a block diagram of one example of a wireless telecommunication network 100 that includes location determination capabilities. The network 100 includes a mobile switching center (MSC) 105 that operates to route calls and control signaling with other mobile switching centers (not shown) and with base transceiver stations or base stations (BSs) 110. Each base station 110 operates to establish and maintain wireless communications with mobile stations 115 in a cell served by the base station 110. Calls placed by a mobile station 115 are set up across a wireless interface 120 with the base station 110 and are routed to a mobile switching center 105. The mobile switching center 105 routes the call, for example, to another base station 110 or mobile switching center that serves a called party, to an external network, such as a public switched telephone network (PSTN) 145, and/or to a public safety answering point (PSAP) 125.

Associated with each base station 110 is position determining equipment (PDE) 130 that includes hardware and/or software used to determine a location of a mobile station 115 served by the corresponding base station 110. In some implementations, the position determining equipment can be associated with the mobile switching center 105 instead of the individual base stations 110. The position determining equipment 130 communicates (directly or through the mobile switching center 105) with a mobile position center 135, which can process and store position data received from the position determining equipment 130 for use by location-based services. For example, the mobile position center 135 can provide position information to the public safety answering point 125, such as when a 911 call is received from a mobile station 115. In addition, the mobile position center 135 can provide position information for use by other applications 140.

Although FIG. 1 depicts one example of a network-based location technology, numerous different types of wireless locating techniques can be used. For example, locations of mobile stations 115 can be determined using one or more network-based or handset-based locating techniques, including using Global Positioning System (GPS), assisted GPS, differential GPS, Advanced Forward Link Trilateration, Angle of Arrival, Enhanced Forward Link Trilateration, Enhanced Observed Time Difference, Timing Advance, Time Difference of Arrival, Roundtrip Time Delay, radio propagation techniques, and/or hybrid techniques. In some situations, it may be possible for mobile stations 115 to be located using more than one technique, either to obtain a hybrid location estimate or to obtain multiple location estimates for a single mobile station 115.

To discover location determination accuracy in a wireless or mobile communication network empirically, multiple (e.g., numbering in the hundreds or thousands) test calls are placed from different locations across a geographic region. Each test call is placed from a known location ("ground truth"), which is known based on, for example, reliable GPS or differential GPS measurements. The known location of the test call is then compared with the estimated location as reported to or by the wireless communication network. For example, the location may be estimated by the network using Time Difference of Arrival techniques or by the mobile station 115 using Advanced Forward Link Trilateration or a built-in GPS receiver that may be much less accurate than that used to determine the ground truth. The estimated location can then be compared with the known location to calculate an error estimate, which reflects the approximate locating accuracy for the test call. By aggregating error estimates from the multiple test calls, an overall location determination accuracy for the network can be calculated.

In some implementations, reliability and precision of locating accuracy determinations in a wireless communication system can be improved by aggregating and reporting data samples according to an expected locating performance associated with each placed call. For example, locating performance is typically correlated with land use characteristics, which tend to impact, e.g., multipath propagation and interference levels. Accordingly, a geographic region can be segmented into different land use categories, or performance types, such as dense urban, grasslands, dense forest, and the like. The categories can be determined based on types of geographic or land use features that result in a similar statistical locating accuracy performance (e.g., a similar range of means and variances).

Figure 2:
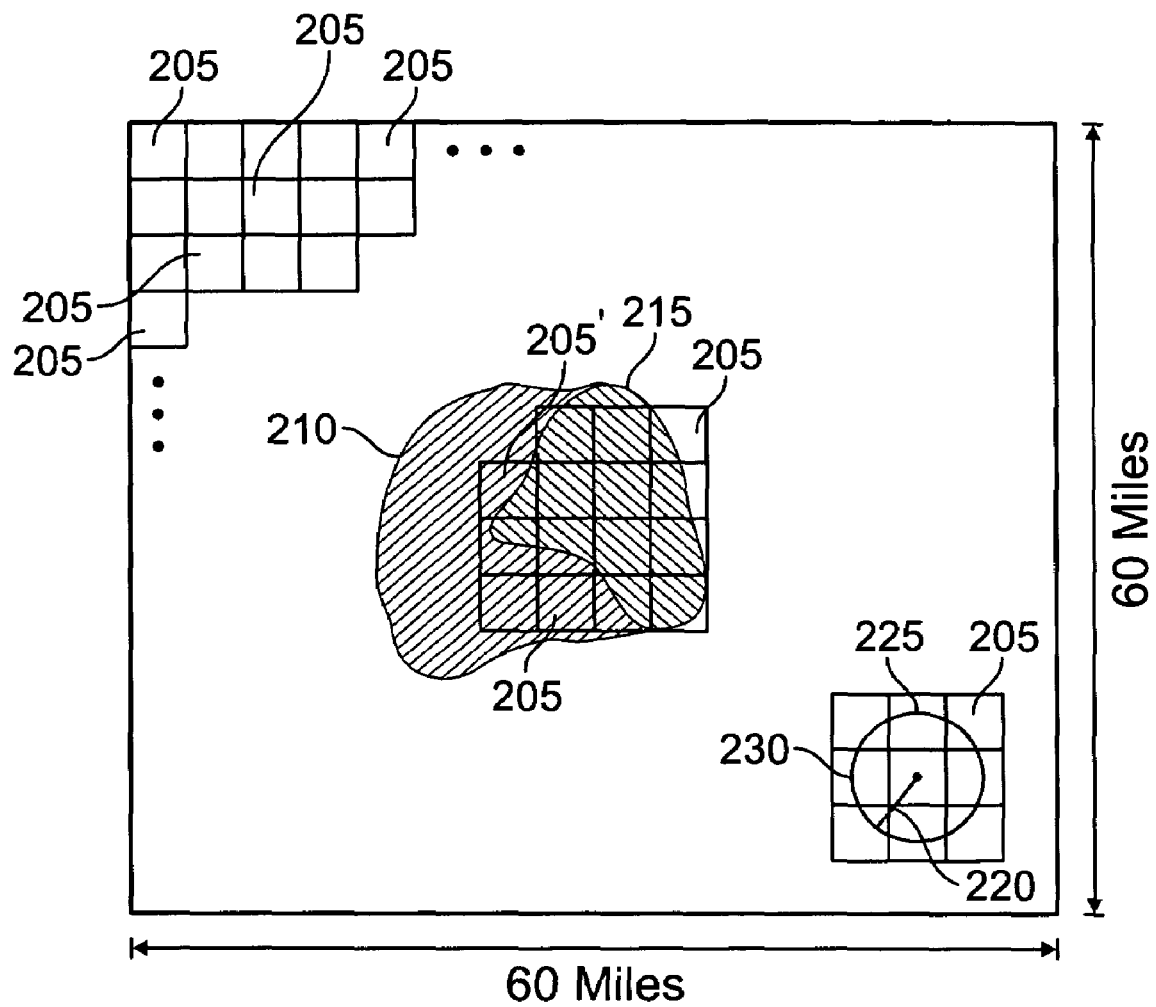
FIG. 2 is a schematic illustration of a geographic region segmented into relatively small areas.

FIG. 2 is a schematic illustration of a geographic region 200 segmented into relatively small areas 205. Typically, the size and extent of the geographic region 200 is defined to be in the range of fifty miles by fifty miles to seventy miles by seventy miles, although other sizes are also possible. In general, the size of the geographic region 200 can be defined based on the amount of variation within one or more particular land use categories or performance types. For example, if performance characteristics of areas categorized as being dense urban vary widely within a particular geographic region 200 (e.g., because the dense urban category includes both areas with densely packed skyscrapers and areas with single story residences), it may be desirable to use relatively smaller geographic regions 200. On the other hand, if performance characteristics within each land use category are relatively consistent (e.g., because a greater number of more refined classifications are used), it may be possible to use relatively larger geographic regions 200.

The geographic region 200 need not be square or rectangular but can be any arbitrary shape. By defining the geographic region 200 to have a limited extent, it is possible to maintain closer statistical performance matching between areas 205 with similar performance characteristics across the region 200. If the region 200 is too large, it may encompass areas 205 that, although they are associated with the same performance type, have statistically different performance characteristics. For example, locating accuracy in a forest in Central Texas may differ statistically from location accuracy in a forest in Georgia because of differences in types of trees and topology. Accordingly, in some implementations, the size and extent of the geographic region 200 can be selected based on the geographic bounds of different regions that, respectively, have identifiably similar performance characteristics (e.g., the Texas Hill Country versus the woods of East Texas), and the size and extent can vary provided that a significant drop off in correlation between performance in widely dispersed areas 205.

The geographic region 200 is logically segmented into much smaller areas 205 of approximately thirty meters by thirty meters. The size of the areas 205 can be selected based on the resolution of satellite imagery (or of the algorithms for analyzing the satellite imagery) used to categorize different areas by performance type. Thus, the geographic region 200 may be segmented into areas 205 of about three meters by three meters or about ten meters by ten meters. Accordingly, the size of the geographic region 200 is typically more than three orders of magnitude greater than the size of the areas 205. For example, a geographic region 200 in the range of about two hundred square miles to about six hundred square miles can be segmented into areas 205 of less than about two hundred fifty square meters or less than about one hundred square meters. In some implementations, the geographic region 200 is segmented into grid-based areas 205 rather than attempting to trace boundaries between different performance types.

Each area 205 is associated with a particular performance type and thus has a particular performance profile that corresponds to an approximate location estimating performance. For purposes of this description, a performance profile includes an indication of one or more performance types. Generally, the performance type or profile associated with each area 205 is selected from a set of available performance types or profiles. For example, the performance types may correspond to the roughly twenty to twenty-five different USGS land use or land cover classifications. However, the expected performance is roughly the same between some of the different USGS classifications, so the set of available performance types may be whittled down to ten or eleven performance types. For example, performance types can include: dense forest (e.g., areas of forest with at least 70% crown closure); light forest—shrub/scrub vegetation (e.g., areas of forest with 25%-70% crown closure); open—vegetated (e.g., agricultural land, rangeland, grassland, golf courses, major parks where significant forested areas are not present, but some level of vegetation exists); open—non vegetated (e.g., agricultural land, rangeland, grassland, strip mines, disturbed land, and some paved areas); low density urban (e.g., mainly residential with homes on large lots); medium density urban (e.g., residential with homes on medium or small lots); commercial/industrial (e.g., areas of medium to heavy industry, medium to large-sized shopping malls, or major business parks); and water (e.g., lakes, large rivers and streams, and canals). In some implementations, performance types can be determined or assigned using an analysis of satellite photography customized to categorize areas 205 between different performance types rather than relying upon USGS classifications.

Typically, a single performance type is assigned to each area 205. For example, if an area 205' includes sixty percent grassland 210 and forty percent forest 215, the area 205' may be designated as having a grassland performance type. Accordingly, the performance profile for the area 205' may indicate simply that the area 205' has a grassland performance type or may indicate a set of characteristics associated with a grassland performance type. In some implementations, multiple performance types can be proportionally assigned to a single area 205. Thus, the performance profile for the area 205' may indicate that the area 205' is sixty percent grassland 210 and forty percent forest 215. Other algorithms can also be used to determine the assigned performance type or types, such as by accounting for characteristics of adjacent or nearby areas 205 that may impact location estimating performance in a particular area 205.

The performance types assigned to the areas 205 can be used to normalize location accuracy data to obtain a more realistic estimate of overall location determination accuracy for the geographic region 200 and/or an overall wireless communication network. For example, because the actual location of each empirical test call is known, a location from which each test call is placed can be mapped to a specific area 205, and the performance type or profile for the specific area 205 can be associated with the test call. Instead of aggregating error estimates with each test call weighted equally, error estimates for test calls from each performance type are aggregated, and, then, the aggregated error estimates for each performance type are weighted according to the percentage of the geographic region 200 that has that performance type.

As a simple example, assume that a geographic region 200 is segmented into a 3600 by 3600 grid of areas 205 and that fifty percent of the areas 205 are assigned a grassland performance type while the other fifty percent of the areas 205 are assigned a forest performance type. During empirical testing, four thousand test calls are placed from areas 205 having the grassland performance type, and one thousand test calls are placed from areas 205 having the forest performance type. In aggregating the results, the test calls are normalized such that the test calls placed from the forested areas 205 collectively have an equal effect on the overall accuracy determination as the test calls placed from the grassland areas 205. Thus, if the test calls placed from the forested areas 205 reveal an average accuracy of eighty meters and the test calls placed from the grassland areas 205 reveal an average accuracy of forty meters, the average overall accuracy would be determined to be sixty meters (instead of forty eight meters if all five thousand test calls are weighted equally).

In some implementations, instead of assigning a single performance type to each test call, multiple performance types can be assigned to each call. For example, if an area 205 includes more than one performance type, a call from that area 205 can be proportionately associated with each of the performance types for the area 205. As another example, an estimated error may be associated with each call. The estimated error can correspond to the accuracy of the underlying technology used to determine the actual location, can correspond to the estimated error for the position estimate (i.e., the difference between the actual location and the estimated location), or can be an estimated position error associated with the determination of the estimated location. The estimated error can then be used to identify an error radius 220. The performance types associated with the call can be proportionately assigned according to the areas 205, or portions thereof, that fall within the error radius (as indicated at 225) of the actual or estimated location 230. Regardless of the manner in which multiple performance types are assigned to each call, the location accuracy data can be further weighted according to the proportions assigned to each performance type.

In other implementations, the performance types assigned to the areas 205 can be used to normalize location accuracy data based on where calls typically are received from. For example, if eighty percent of all calls are known to be placed from dense urban areas but only forty percent of test calls are placed from dense urban areas, such test calls can be weighted accordingly. Thus, empirical test call data can be normalized using associated performance types according to a geography-based proportional distribution of performance types (i.e., by normalizing call data based on the ratios between different performance type areas in a geographical region), a call-based proportional distribution of performance types (i.e., by normalizing call data based on the ratios of performance types from which calls are placed in a geographical region), some combination of the two, or some other proportional distribution of performance types.

Furthermore, instead of repeatedly performing empirical testing to monitor for changes in locating accuracy or to simply confirm that no change has occurred, locating accuracy determinations can be accurately predicted using data from subscriber calls. In other words, predictive models can be used to reliably predict variations in location determination accuracy. For purposes of this description, subscriber calls are intended to refer to calls in a communication network that are generally placed by ordinary subscribers and for which ground truth data is unavailable, while test calls refer to calls for which ground truth data (and, in some cases, relatively precise time of call information) is available. Predictions of locating accuracy can be made by aggregating subscriber call location estimates according to the wireless locating techniques used to estimate subscriber call locations.

Figure 3:
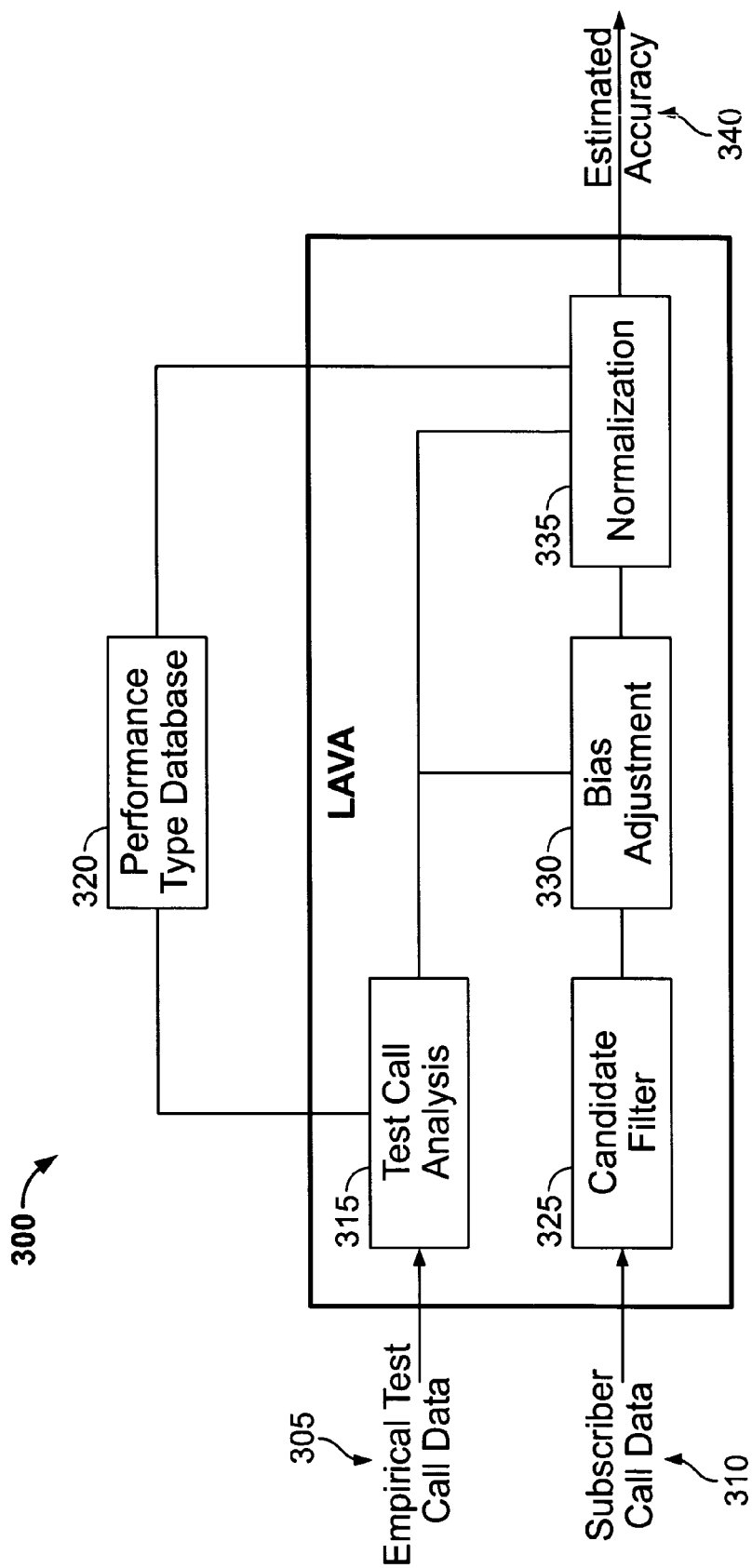
FIG. 3 is a block diagram of a location accuracy and variance analysis system.

FIG. 3 is a block diagram of a location accuracy and variance analysis system 300. The system 300 receives as inputs data 305 from empirical test calls and data 310 from subscriber calls. When performing empirical testing, in addition to the actual location and the estimated location for each test call, the locating technique, or "solution source," used to estimate the location of each empirical test call can also be reported. In addition, an estimated position error can also be reported or calculated for the estimated location, and data relating to network operations associated with each test call can be reported. The estimated position error generally relates to a confidence level for the estimated location determined using the locating technique. The estimated position error can be a three-dimensional error or a two-dimensional horizontal estimated position error. In addition, the estimated position error can be reported as a single parameter (e.g., indicative of an error radius or other uncertainty observations) or as a set of parameters (e.g., from which the estimated position error can be calculated).

Accordingly, the data 305 for each empirical test call can include: (1) the actual or exact location of the mobile station from which the test call is placed; (2) an estimated position determined based on one or more locating techniques; (3) an estimated position error associated with the estimated position; (4) which locating techniques are used to determine the estimated position; and (5) data relating to network operations (e.g., network errors, number of dropped packets, whether a timeout occurred, and the like).

The test call data 305 is received by a test call analysis module 315, which identifies one or more performance types associated with the test call using information stored in a performance type database 320. For example, the performance type database 320 can store information identifying a performance profile associated with each individual area in an overall geographic region. The test call analysis module 315 can identify a performance type, for example, based on which individual area includes the actual location of the test call and/or the proportions of different areas included within an error radius of the actual location. In some cases, the test call analysis module 315 can normalize the test call data 305 according to a known performance type distribution for the geographic region or wireless communication network. In addition or as an alternative, the test call analysis module 315 can calculate or determine a ratio of test calls associated with each performance type (e.g., 43% dense urban, 32% commercial, 14% light forest, and 11% open—vegetated).

The test call analysis module 315 also calculates a distribution of locating techniques for the test calls. For example, the test call analysis module 315 determines how many test calls have an estimated position determined using each of the different locating techniques and calculates a ratio of locating techniques for the overall collection of test calls (e.g., 45% Assisted GPS, 34% Advanced Forward Link Trilateration, and 21% Angle of Arrival). The test call analysis module 315 determines a baseline accuracy for the geographic region based on the empirical test call data. The baseline accuracy can include data relating to means and variances of location determination estimates and/or data relating to confidence levels associated with location determination estimates. For example, the baseline accuracy may indicate that a location of a certain percentage (e.g., 67% or 95%) of calls can be determined within a particular error bound (e.g., one hundred meters or two hundred fifty meters).

Typically, the baseline accuracy is determined based on the actual position errors (i.e., the difference between the actual location of each test call and the estimated position determined using a locating technique) for the test calls, as opposed to the estimated position errors, which are generally calculated based on some knowledge of likely accuracy (e.g., number of satellites and/or signal strength in a GPS locating technique or covariance phase-shift data from a time difference of arrival algorithm). For purposes of subsequent predictive modeling, however, it can be useful to calculate a bias between the actual position errors and the estimated position errors. For example, the actual position error for a set of test calls may be an average or median error, such that approximately fifty percent of test calls are more accurate and fifty percent of test calls are less accurate. The estimated position error may be calculated based on an expectation that sixty-seven percent of the actual locations fall within the estimated position error from the estimated locations. Accordingly, the test call analysis module 315 can be used to determine the bias, which facilitates more reliable locating accuracy predictions.

In some cases, more than one bias may be calculated. For example, bias may be calculated separately for each different locating technique and/or for each different performance type. In addition, different biases can be calculated for different confidence levels. One bias may be calculated between the estimated position error and the average or median actual position error, another bias may be calculated between the estimated position error and an error that encompasses 75% of the actual position errors from the test calls (e.g., a 75% confidence level), and yet another bias may be calculated between the estimated position error and an error that encompasses 95% of the actual position errors from the test calls (e.g., a 95% confidence level). The different biases can be used to adjust estimated position errors from subscriber calls to more accurately predict locating accuracy and/or to predict accuracy distributions.

In some implementations, the test call analysis module 315 can use the data relating to network operations to identify test call data 305 that should be ignored. For example, if a particular test call 305 is dropped before adequate time elapses to obtain an estimated position, the test call data 305 for that test call may be erroneous or incomplete and therefore may be deleted or ignored for purposes of further calculations.

The subscriber call data 310 received by the location accuracy and variance analysis system 300 includes the same types of data as are included in the test call data 305, except that the actual location is unknown. Accordingly, the subscriber call data 310 includes: (1) an estimated position determined based on one or more locating techniques; (2) an estimated position error associated with the estimated position; (3) which locating techniques are used to determine the estimated position; and (4) data relating to network operations (e.g., network errors, number of dropped packets, whether a timeout occurred, and the like).

The subscriber call data 310 is received by a candidate filtering module 325, which determines whether the data 310 associated with each subscriber call is a candidate for inclusion in the predictive modeling techniques. This determination can be made based on the received data relating to network operations. For example, if there are more than a certain number or type of network errors or dropped packets or if a timeout occurred during the subscriber call, the candidate filtering module 325 may preclude the data 310 for that subscriber call from being used in the predictive modeling. In addition, other types of information can be used to filter subscriber call data 310. For example, if the estimated position error is greater than 1500 meters, it may be assumed that some type of error occurred during that subscriber call and the data 310 for the subscriber call can be removed as a candidate for inclusion in the predictive modeling.

Using the set of candidate subscriber call data 310, the location accuracy and variance analysis system 300 can perform predictive modeling to generate one or more estimated accuracy values. A bias adjustment module 330 can be used to remove bias, as calculated by the test call analysis module 315, from the data 310 for the individual subscriber calls. Furthermore, a normalization module 330 can normalize the set of candidate subscriber call data 310 according to the ratio of locating techniques identified by the test call analysis module 315 and/or according to the ratio of performance types identified by the test call analysis module 315. In some implementations, the operations of the normalization module 335 may be performed prior to the operations of the bias adjustment module 330. In other implementations, operations of the normalization module 335 may be interleaved with the operations of the bias adjustment module 330.

The bias adjustment module 330 can subtract a calculated bias from or add a calculated bias to the data 310 for individual subscriber calls or aggregated, normalized subscriber call data 310. For example, if the estimated position error corresponds to a 67% confidence level and an estimated accuracy prediction at a 50% confidence level is desired, the bias adjustment module 330 may subtract a calculated bias from the subscriber call data, while a conversion to a 95% confidence level may necessitate adding a calculated bias to the subscriber call data. Furthermore, the bias may be added or subtracted after aggregating and/or normalizing subscriber call data 310 for a particular locating technique and/or performance type. In some implementations, bias adjustments can be performed using other types of functions (e.g., linear, exponential, etc.), look up tables, or other modifications.

The normalization module 330 can normalize subscriber call data 310 according to the ratio of locating techniques identified by the test call analysis module 315 such that the collective subscriber call data 310 corresponding to each locating technique is weighted the same or substantially the same during predictive modeling as in empirical testing. For example, the average estimated position error for location estimates determined using an Angle of Arrival locating technique may be four hundred meters, but the Angle of Arrival locating technique may account for only one percent of the locating technique measurements made during empirical testing. Accordingly, even if the Angle of Arrival locating technique is used by twenty percent of the subscriber calls, the data 310 for those subscriber calls will account for only one percent of the estimated accuracy determined by the location accuracy and variance analysis system 300.

In addition or as an alternative, the normalization module 330 can normalize subscriber call data 310 according to the ratio of performance types identified by the test call analysis module 315. The normalization can be based on a mapping of subscriber calls to areas and their corresponding performance types using the performance type database 320. For example, if 39% of the test calls are placed from a dense urban performance type but 64% of subscriber calls are placed from a dense urban performance type, the subscriber call data 310 associated with the dense urban performance type can be weighted to account for only 39% of the estimated accuracy determined by the predictive model.

In some implementations, the normalization module 330 can normalize the subscriber call data 310 according to a known performance type distribution for the geographic region or wireless communication network. Furthermore, normalization according to performance type can be performed separately for each locating technique. For example, if two hundred subscriber calls are located using a GPS locating technique, 50% of a geographic region is associated with a dense urban performance type, and only ten of the subscriber calls located using the GPS locating technique are associated with the dense urban performance type, the data 310 from those ten subscriber calls can be weighted to account for 50% of the subscriber calls that use the GPS locating technique. The other one hundred ninety subscriber calls can be weighted to account for the other 50% of the subscriber calls that use the GPS locating technique. Then, collectively, the subscriber calls that use the GPS locating technique can be further weighted according to the ratios of locating techniques identified by the test call analysis module 315.

In normalizing subscriber call data 310 according to performance type, each subscriber call is associated with one or more performance types. This association can be based on the one or more performance types (or the performance profile) associated with an area in which the subscriber mobile station is located. The location can be based on the estimated location. In some implementations, the association of a subscriber call with performance types can be based on areas within an error radius of the estimated location. For example, the error radius can be determined based on the estimated position error data for the subscriber call or based on the estimated position error as adjusted by an error bias value. In some cases, the error radius can be selected to be one of a limited number of discrete radius sizes (e.g., 45 meters, 90 meters, or 150 meters). The performance types associated with the areas within the error radius can be proportionately weighted according to the ratio of each area to the area of a circle defined by the error radius.

In some implementations, normalizing subscriber call data 310 according to performance type can be omitted, especially for large sample sizes (i.e., large amounts of subscriber call data 310). Once the subscriber call data 310 has been normalized, an estimated accuracy 340 can be calculated for the geographic region by aggregating the normalized results. As discussed above, multiple different estimated accuracies (e.g., corresponding to different confidence levels) can be determined. The estimated accuracies can then be used instead of repeatedly performing empirical testing. In some cases, some empirical testing (e.g., more limited in frequency or number of test calls than conventional empirical testing) may be performed to confirm the predicted results and/or to update the baseline accuracy data in the location accuracy and variance analysis system 300.

Figure 4:
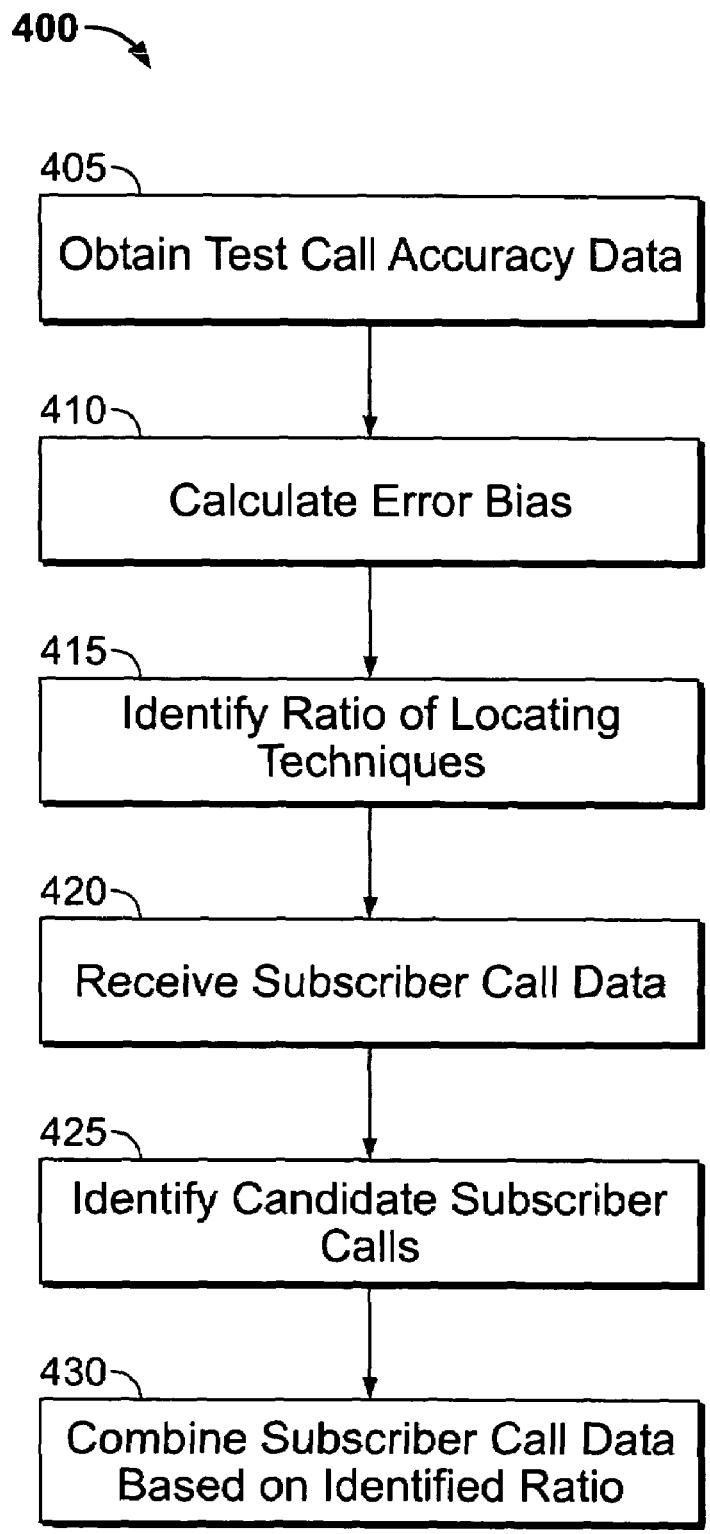
FIG. 4 is a flow diagram of a process for ascertaining location determination accuracy in a mobile telecommunications environment.

FIG. 4 is a flow diagram of a process 400 for ascertaining location determination accuracy in a mobile telecommunications environment. Location determination accuracy data for empirical test calls in a geographic region is obtained (405). For example, an estimated location of a mobile station for each test call is determined using one or more wireless locating techniques and is compared to a known location of the mobile station when the test call is placed to calculate an actual position error. Typically, the test calls are placed at relatively random locations and under a variety of circumstances (e.g., stationary and moving, different times of the day, different weather conditions). An error bias between the actual position error and an estimated position error for each test call is determined (410).

An approximate ratio of wireless locating techniques for the empirical test calls is identified (415). For example, an estimated location of some of the test calls may be determined using a GPS locating technique, some using Advanced Forward Link Trilateration, and some using a hybrid locating technique. The number of test calls that use each locating technique is monitored, and a ratio between the various locating techniques is determined. In some implementations, the ratio can be approximated by rounding to a whole number percentage or using interval ranges (e.g., 40-40.5%, 40.5-41%, etc.).

Subsequently, data relating to subscriber calls in the geographic region is received (420). The subscriber call data can include a location estimate determined using one or more wireless locating techniques, an estimated position error, an indication of a wireless locating technique used for each subscriber call, and network operation data. Subscriber call candidates for use in estimating location determination accuracy are identified based on the network operation data or other information indicating a reliability or usefulness of the data associated with each subscriber call (425). By screening subscriber calls to identify candidates, subscriber call data that is particularly unreliable or that tends to undesirably skew the results in a manner that is not representative of actual accuracy can be discarded.

Location determination accuracy in the geographic region is estimated by combining the data relating to subscriber calls according to the ratio of wireless locating techniques (430). For example, the estimated position error for the subscriber calls is aggregated to calculate the location determination accuracy. The estimated position error for subscriber calls that use each wireless locating technique is weighted according to a percentage of the test calls that used the corresponding wireless locating technique. In some implementations, the estimated position error for subscriber calls that are associated with a particular location-estimating performance type (i.e., having relatively predictable set of performance characteristics for purposes of estimating location) is weighted according to a percentage of the geographical region having that particular performance type. In addition, the estimated position error for the individual subscriber calls, as aggregated for each wireless locating technique, or as aggregated overall can be adjusted according to the error bias. The weighted and bias-adjusted aggregation serves as an estimate of location determination accuracy.

Figure 5:
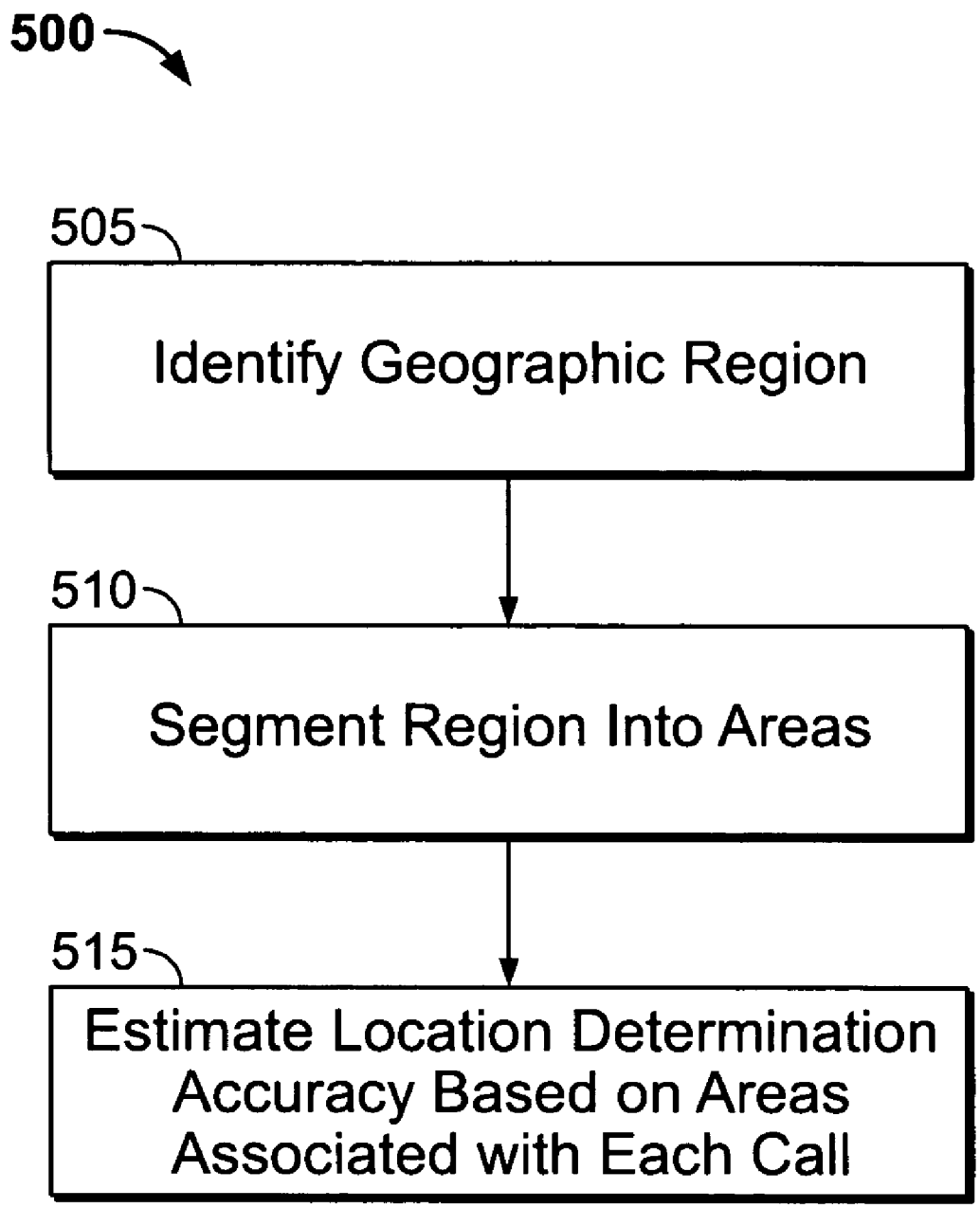
FIG. 5 is a flow diagram of a process for facilitating determinations of locating accuracy in a mobile telecommunications environment.

FIG. 5 is a flow diagram of a process 500 for facilitating determinations of locating accuracy in a mobile telecommunications environment. A geographic region is identified (505). Generally, the geographic region is selected such that it covers at least a substantial portion of wireless communication service area but does not cover different areas that, although they have similar land use types, have statistically diverse performance characteristics with respect to wireless locating techniques. For example, regions in the range of fifty miles by fifty miles to seventy miles by seventy miles may provide a balance between these competing interests. In some implementations, it is unnecessary for the regions to be square; instead, the regions can have relatively arbitrary shapes. In addition, smaller or larger regions may be appropriate in some circumstances, such as where there are very rapid or very slow changes in topography and land use across a particular territory.

The geographic region is logically segmented the into multiple areas (510). For example, a grid overlay can be applied to the geographic region to define square, rectangular, triangular, or other-shaped areas. In some implementations, each area can have dimensions of approximately thirty meters by thirty meters. The size of the areas can be larger or smaller, however, and can be based, for example, on the resolution of satellite imagery and/or the resolution of an automated algorithm for analyzing satellite imagery and performing land use classification. Each area is associated with one or more performance profiles that define a locating accuracy performance. For example, each performance profile can correspond to one of multiple land use categories, and the characteristics of each land use category can impact locating accuracy performance. Each performance profile can be determined using an analysis of satellite photography, based on USGS land use and land cover classifications, and the like.

Location determination accuracy is estimated based on one or more areas associated with each wireless call in the geographic region (515). In some implementations, the location determination accuracy can be estimated by normalizing location error data from the wireless calls according to an approximate percentage of the geographic region associated with each performance profile. For example, the area that contains the estimated location of each call can have a particular performance profile, and an estimated position error from each call can be weighted according to the percentage of the geographic region associated with that performance profile. Thus, the normalization of the location error data can include determining the approximate percentage of the geographic region associated with each performance profile, determining one or more performance profiles associated with each wireless call, and weighting location error data for wireless calls associated with each performance profile according to the corresponding approximate percentage.

Location determination accuracy can be estimated based on wireless test calls, such that calculations based on the test calls may more accurately reflect locating accuracy in the region. For example, if the majority of test calls are placed from areas that represent a minority of topographical features in a region, the test calls may not accurately reflect performance in the region. By weighting the test calls according to performance profiles, a more accurate estimate of actual locating accuracy across the region can be obtained. In some implementations, locating determination accuracy can be estimated based on subscriber calls, such that calculations based on the subscriber calls may more accurately reflect locating accuracy throughout the region and/or more accurately reflect distribution of the test calls.

In some implementations, multiple areas can be associated with each wireless call based on the estimated location and the location error data for the call. In such a situation, location determination accuracy can be calculated by determining an approximate percentage of each area located within an error radius of each wireless call's estimated location and weighting the location error data for each wireless call according to the identified percentages. For example, instead of associating a wireless call only with an area (and its associated performance profile) that contains the estimated location, the wireless call may be associated with multiple areas (and their associated performance profiles) that fall within an error radius of the estimated location. This association with multiple areas can be weighted according to the percentage of each area that falls within the error radius.

The described techniques and all of the functional operations described in this specification can be implemented in digital electronic circuitry, or in computer software, firmware, or hardware, including the structural means disclosed in this specification and structural equivalents thereof, or in combinations of them. The techniques can be implemented as one or more computer program products, i.e., one or more computer programs tangibly embodied in an information carrier, e.g., in a machine readable storage device, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification can be performed by one or more programmable processors executing one or more computer programs to perform described functions by operating on input data and generating output. The processes and logic flows can also be performed by, and apparatus can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, the processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, the techniques can be implemented using a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The techniques can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the described techniques, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made. For example, the various weightings of subscriber call data and removal of error bias can be performed in any order and/or can be performed in an iterative or interleaved manner. In addition, the flow diagrams include multiple operations, at least some of which can be performed in a different order than shown or in parallel. Accordingly, other implementations are within the scope of the following claims.

What is claimed is:

1. A method, comprising one or more operations implemented by a computer, for ascertaining location determination accuracy in a mobile telecommunications environment, the method comprising:
   obtaining location determination accuracy data for a plurality of empirical test calls in a geographic region, a location of a wireless station for each test call determined using at least one of a plurality of wireless locating techniques;
   identifying at least an approximate ratio of wireless locating techniques for the empirical test calls, wherein the identified ratio is based on a comparison of a number of empirical test calls that use a first wireless locating technique with a number of empirical test calls that use at least one other wireless locating technique;
   receiving data relating to subscriber calls involving wireless telecommunication devices in the geographic region, the data including information relating to location estimates determined using at least one of the wireless locating techniques; and
   automatically estimating location determination accuracy in the geographic region by combining at least portions of the data relating to subscriber calls according to the identified ratio of wireless locating techniques for the empirical test calls.

2. The method of claim 1 wherein:
   the identified ratio of wireless locating techniques for the empirical test calls is determined based on at least an approximate percentage of the empirical test calls that use each wireless locating technique; and
   combining at least portions of the data relating to subscriber calls according to the identified ratio comprises weighting data relating to subscriber calls that use each wireless locating technique using a corresponding percentage.

3. The method of claim 1 wherein the data relating to subscriber calls includes an estimated position error and an identification of a wireless locating technique for each subscriber call.

4. The method of claim 3 wherein the data relating to subscriber calls further includes information relating to at least one network operation, the method further comprising identifying subscriber call candidates for use in estimating location determination accuracy based on the information relating to at least one network operation.

5. The method of claim 3 wherein the location determination accuracy data for each empirical test call comprises a difference between an actual location associated with the test call and an estimated position determined using a wireless locating technique for the test call, the method further comprising:
   determining an error bias between the difference and an estimated position error for each test call; and
   adjusting the estimated position error for the subscriber calls according to the error bias to estimate location determination accuracy.

6. The method of claim 1 further comprising:
   segmenting the geographic region into a plurality of areas, each area associated with one of a plurality of location-estimating performance types;
   identifying at least an approximate ratio among the location-estimating performance types; and
   weighting at least one of the location determination accuracy data for the empirical test calls or portions of the data relating to the subscriber calls according to the identified performance type ratio to estimate location determination accuracy, wherein weighting is based on at least one performance type associated with each empirical test call or subscriber call.

7. The method of claim 6 further comprising identifying the at least one performance type associated with each empirical test call or subscriber call based on the performance type of the areas within an error range of an estimated position.

8. The method of claim 1 wherein estimating location determination accuracy in the geographic region further comprises combining at least portions of the data relating to subscriber calls according to the identified ratio and at least partially based on a volume of subscriber calls.

9. The method of claim 1 wherein estimating location determination accuracy in the geographic region further comprises combining at least portions of the data relating to subscriber calls according to the identified ratio and at least partially based on a volume of subscriber calls in the geographic region.

10. The method of claim 6 wherein weighting is further based on a volume of subscriber calls in each area.

11. An article of manufacture comprising a tangible machine-readable medium storing instructions for causing one or more data processing apparatus to perform operations for ascertaining location determination accuracy in a mobile telecommunications environment, the operations comprising:
    receiving location determination accuracy data for a plurality of empirical test calls in a geographic region, a location of a wireless station for each test call determined using at least one of a plurality of wireless locating techniques;
    identifying at least an approximate ratio of wireless locating techniques for the empirical test calls, wherein the identified ratio is based on a comparison of a number of empirical test calls that use a first wireless locating technique with a number of empirical test calls that use at least one other wireless locating technique;
    receiving data relating to subscriber calls involving wireless telecommunication devices in the geographic region, the data including information relating to location estimates determined using at least one of the wireless locating techniques; and
    estimating location determination accuracy in the geographic region by combining at least portions of the data relating to subscriber calls according to the identified ratio of wireless locating techniques for the empirical test calls.

12. The article of claim 11 wherein:
    the identified ratio of wireless locating techniques for the empirical test calls is determined based on at least an approximate percentage of the empirical test calls that use each wireless locating technique; and
    combining at least portions of the data relating to subscriber calls according to the identified ratio using weighting data relating to a percentage of subscriber calls that use each wireless locating technique.

13. The article of claim 11 wherein the data relating to subscriber calls includes an estimated position error and an identification of a wireless locating technique for each subscriber call.

14. The article of claim 13 wherein the data relating to subscriber calls further includes information relating to at least one network operation, the instructions further operable to cause one or more data apparatus to perform operations comprising identifying subscriber call candidates for use in estimating location determination accuracy based on the information relating to at least one network operation.

15. The article of claim 13 wherein the location determination accuracy data for each empirical test call comprises a difference between an actual location associated with the test call and an estimated position determined using a wireless locating technique for the test call, the instructions further operable to cause one or more data apparatus to perform operations comprising:
   determining an error bias between the difference and an estimated position error for each test call; and
   adjusting the estimated position error for the subscriber calls according to the error bias to estimate location determination accuracy.

16. The article of claim 11 wherein the instructions further operable to cause one or more data apparatus to perform operations comprising:
   segmenting the geographic region into a plurality of areas, each area associated with one of a plurality of location-estimating performance types;
   identifying at least an approximate ratio among the location-estimating performance types; and
   weighting at least one of the location determination accuracy data for the empirical test calls or portions of the data relating to the subscriber calls according to the identified performance type ratio to estimate location determination accuracy, wherein weighting is based on at least one performance type associated with each empirical test call or subscriber call.

17. The article of claim 16 wherein the instructions further operable to cause one or more data apparatus to perform operations comprising identifying the at least one performance type associated with each empirical test call or subscriber call based on the performance type of the areas within an error range of an estimated position.

18. The article of claim 11 wherein estimating location determination accuracy in the geographic region further comprises combining at least portions of the data relating to subscriber calls according to the identified ratio and at least partially based on a volume of subscriber calls.

19. The article of claim 11 wherein estimating location determination accuracy in the geographic region further comprises combining at least portions of the data relating to subscriber calls according to the identified ratio and at least partially based on a volume of subscriber calls in the geographic region.

20. The article of claim 16 wherein weighting is further based on a volume of subscriber calls in each area.

21. A system for ascertaining location determination accuracy in a mobile telecommunications environment, the system comprising:
   a memory comprising one or more modules; and
   a processor configured to execute one or more of the modules to:
      receive location determination accuracy data for a plurality of empirical test calls in a geographic region, a location of a wireless station for each test call determined using at least one of a plurality of wireless locating techniques;
      identify at least an approximate ratio of wireless locating techniques for the empirical test calls, wherein the identified ratio is based on a comparison of a number of empirical test calls that use a first wireless locating technique with a number of empirical test calls that use at least one other wireless locating technique;
      receive data relating to subscriber calls in the geographic region, the data including information relating to location estimates determined using at least one of the wireless locating techniques; and
      estimate location determination accuracy in the geographic region by combining at least portions of the data relating to subscriber calls according to the identified ratio of wireless locating techniques for the empirical test calls.

22. The system of claim 21 wherein the data relating to subscriber calls further includes information relating to at least one network operation, the instructions further operable to cause one or more data apparatus to perform operations comprising identifying subscriber call candidates for use in estimating location determination accuracy based on the information relating to at least one network operation.

23. The system of claim 22 wherein the location determination accuracy data for each empirical test call comprises a difference between an actual location associated with the test call and an estimated position determined using a wireless locating technique for the test call, the instructions further operable to cause one or more data apparatus to perform operations comprising:
   determining an error bias between the difference and an estimated position error for each test call; and
   adjusting the estimated position error for the subscriber calls according to the error bias to estimate location determination accuracy.

24. The system of claim 21 wherein the instructions further operable to cause one or more data apparatus to perform operations comprising:
   segmenting the geographic region into a plurality of areas, each area associated with one of a plurality of location-estimating performance types;
   identifying at least an approximate ratio among the location-estimating performance types; and
   weighting at least one of the location determination accuracy data for the empirical test calls or portions of the data relating to the subscriber calls according to the identified performance type ratio to estimate location determination accuracy, wherein weighting is based on at least one performance type associated with each empirical test call or subscriber call.

25. The system of claim 21 wherein the instructions further operable to cause one or more data apparatus to perform operations comprising identifying the at least one performance type associated with each empirical test call or subscriber call based on the performance type of the areas within an error range of an estimated position.

26. The system of claim 21 wherein estimating location determination accuracy in the geographic region further comprises combining at least portions of the data relating to subscriber calls according to the identified ratio and at least partially based on a volume of subscriber calls.

27. The system of claim 21 wherein weighting is further based on a volume of subscriber calls in an each area.

* * * * *

UNITED STATES PATENT AND TRADEMARK OFFICE
CERTIFICATE OF CORRECTION

PATENT NO. : 7,634,266 B2  
APPLICATION NO. : 11/255466  
DATED : December 15, 2009  
INVENTOR(S) : McDougall et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 364 days.

Signed and Sealed this

Ninth Day of November, 2010

David J. Kappos  
*Director of the United States Patent and Trademark Office*